«12» United States Patent
Kocher

(10) Patent No.: US 8,294,420 B2
(45) Date of Patent: Oct. 23, 2012

(54) KIOSK VEHICLE CHARGING AND SELECTING SYSTEMS

(75) Inventor: Mark J. Kocher, Raleigh, NC (US)

(73) Assignee: Schneider Electric USA, Inc., Palatine, IL (US)

( * ) Notice: Subject to any disclaimer, the term of this patent is extended or adjusted under 35 U.S.C. 154(b) by 41 days.

(21) Appl. No.: 12/639,666

(22) Filed: Dec. 16, 2009

(65) Prior Publication Data

US 2011/0074350 A1   Mar. 31, 2011

Related U.S. Application Data

(60) Provisional application No. 61/246,870, filed on Sep. 29, 2009.

(51) Int. Cl.
*H02J 7/00* (2006.01)
(52) U.S. Cl. ......... 320/109; 320/107; 320/110; 320/124
(58) Field of Classification Search .................. 320/107, 320/109, 110, 124
See application file for complete search history.

(56) References Cited

U.S. PATENT DOCUMENTS

| | | | |
|---|---|---|---|
| 3,614,581 A | 10/1971 | Frost | |
| 3,775,659 A | 11/1973 | Carlsen | |
| 4,510,431 A | 4/1985 | Winkler | |
| 4,663,579 A | 5/1987 | Yang | |
| 5,204,611 A * | 4/1993 | Nor et al. | 320/145 |
| 5,539,297 A | 7/1996 | Fiebig | |
| 5,548,200 A * | 8/1996 | Nor et al. | 320/109 |
| 5,594,318 A * | 1/1997 | Nor et al. | 320/108 |
| 5,629,601 A | 5/1997 | Feldstein | |
| 5,757,163 A | 5/1998 | Brotto | |
| 5,955,868 A | 9/1999 | Kaite | |
| 6,097,174 A | 8/2000 | Yang | |
| 6,127,798 A | 10/2000 | Lansang | |
| 6,288,518 B1 | 9/2001 | Yang | |
| 6,445,159 B1 | 9/2002 | Ramsden | |
| 6,777,913 B2 | 8/2004 | You | |
| 7,181,409 B1 * | 2/2007 | Murakami et al. | 705/5 |
| 7,256,516 B2 * | 8/2007 | Buchanan et al. | 307/62 |
| 2010/0010043 A1 * | 1/2010 | Hanatani et al. | 514/319 |
| 2010/0228405 A1 * | 9/2010 | Morgal et al. | 701/2 |
| 2010/0256830 A1 * | 10/2010 | Kressner et al. | 700/291 |
| 2010/0274697 A1 * | 10/2010 | Zyren | 705/34 |
| 2010/0280675 A1 * | 11/2010 | Tate et al. | 700/295 |
| 2011/0077809 A1 * | 3/2011 | Leary | 701/22 |

* cited by examiner

*Primary Examiner* — Yalkew Fantu
(74) *Attorney, Agent, or Firm* — Nixon Peabody LLP

(57) ABSTRACT

A vehicle charging and selection system for kiosk operated electrical vehicles. The system includes a utility connected AC charging source, a battery-to-battery DC charging source, a number of vehicle charging stations, a local power bus connectable to both charging sources and each of the charging stations and a system controller connected to each of the charging stations. The system controller evaluates the vehicle battery condition of each electric vehicle connected to one of the charging stations and determines the most efficient method for charging the largest number of vehicle batteries based on current condition of the individual batteries, weather conditions, time of day, status of the utility electrical grid, etc. The system controller also selects one of the connected electric vehicles for customer use by using the battery charging information and additional information about the desired trip provided by the customer and other external data sources monitored by the system controller.

29 Claims, 5 Drawing Sheets

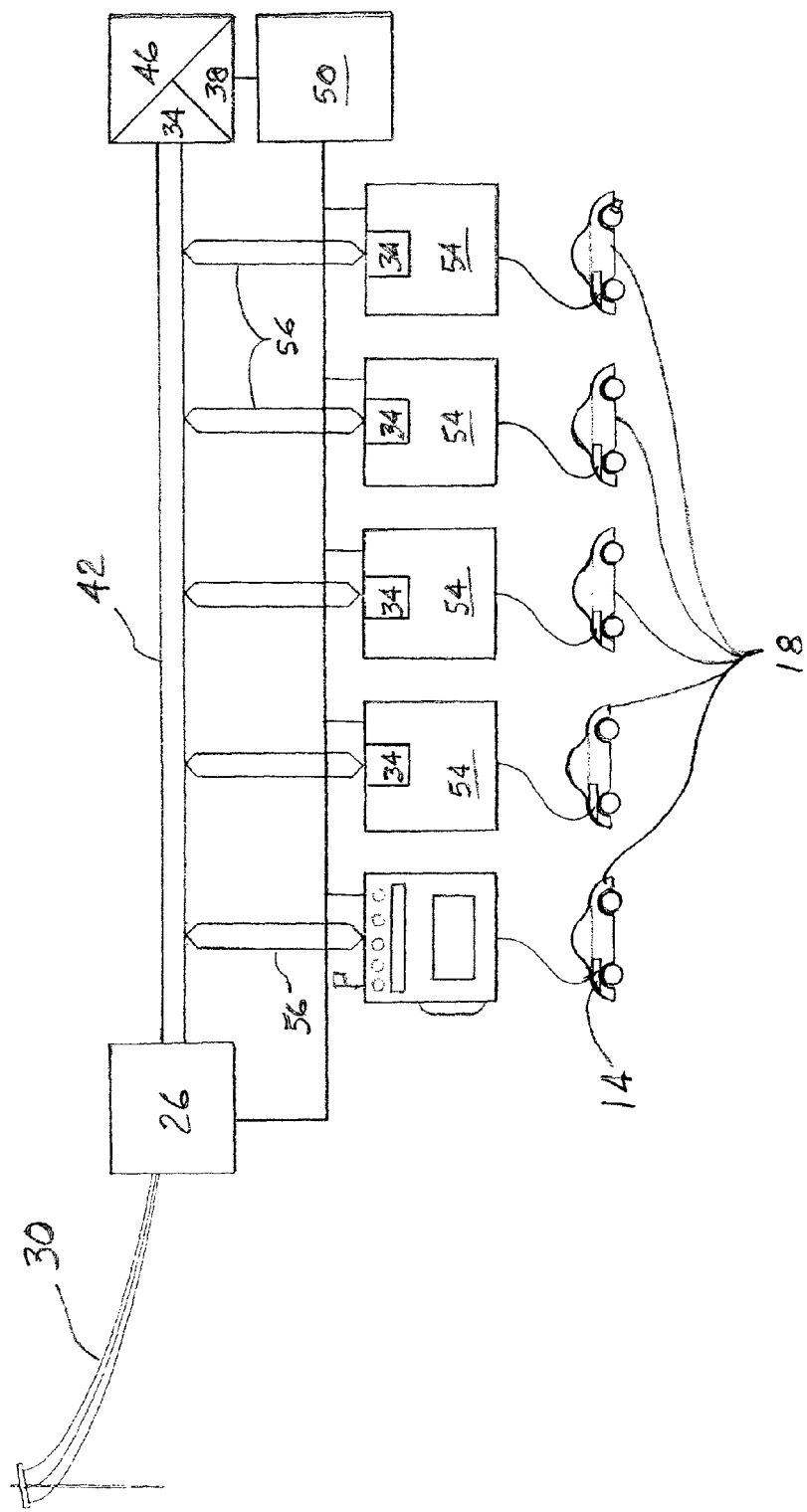

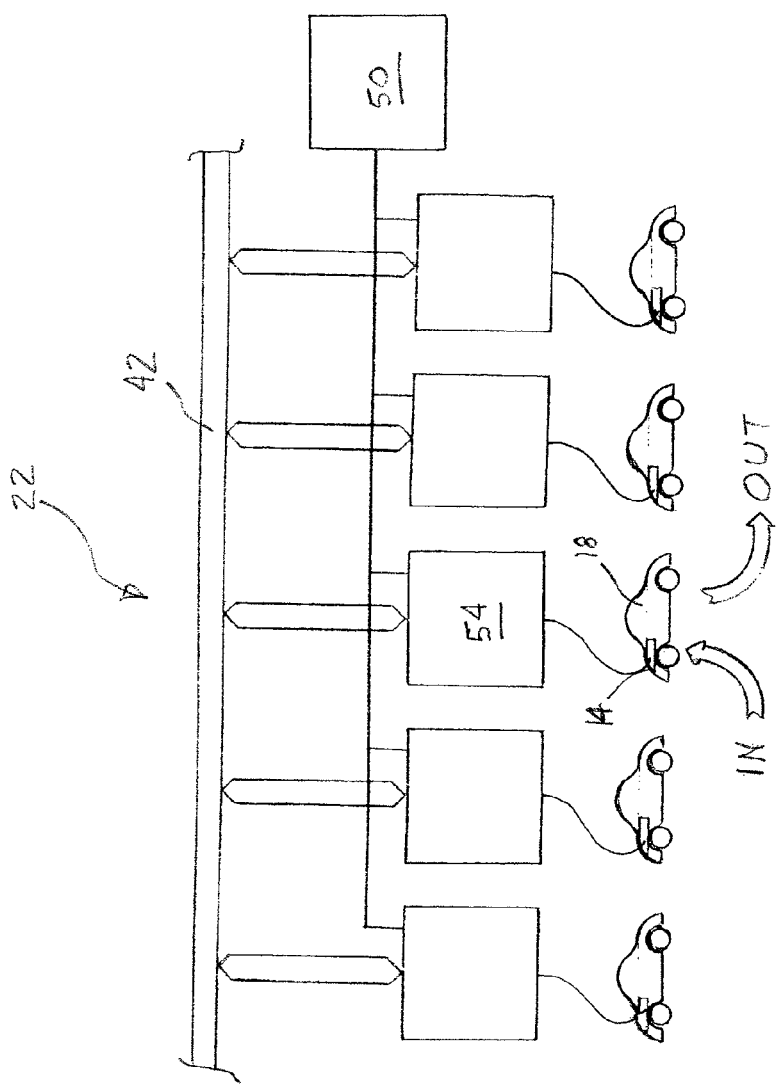

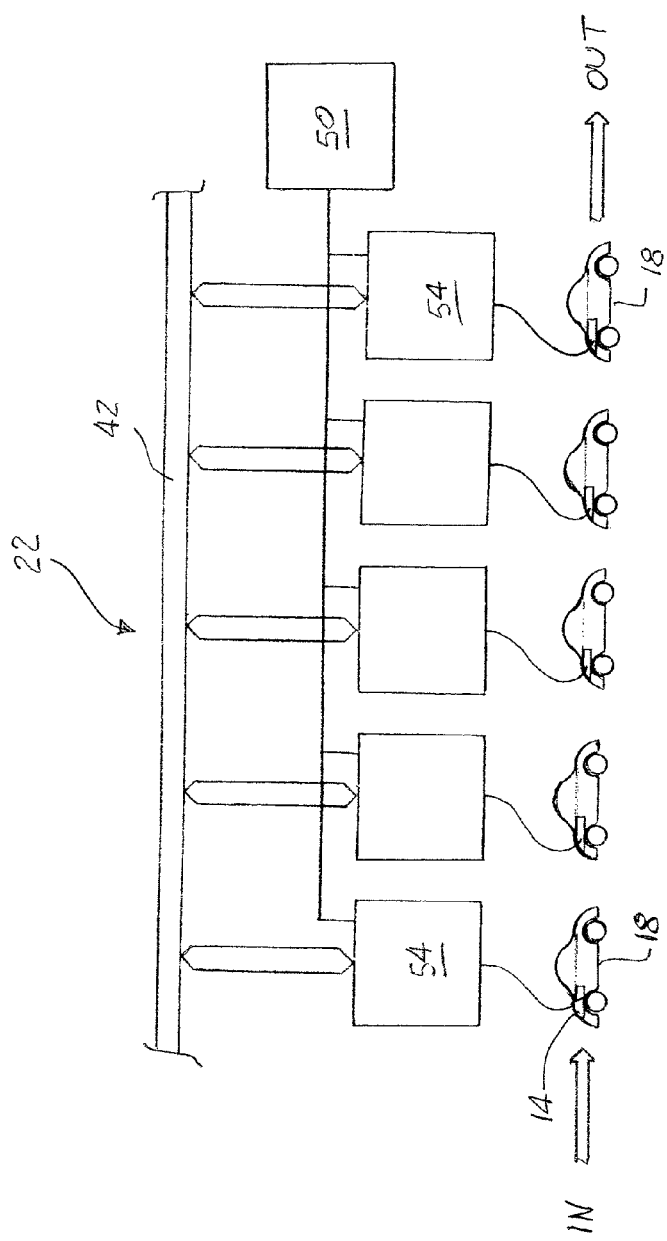

KIOSK VEHICLE CHARGING AND SELECTING SYSTEMS

CROSS-REFERENCE TO RELATED PATENTS

This application claims the benefit of the filing date of prior-filed provisional application No. 61/246,870 filed Sep. 29, 2009.

STATEMENT REGARDING FEDERALLY SPONSORED RESEARCH OR DEVELOPMENT

Not applicable

FIELD OF THE INVENTION

The present invention relates to electric vehicles, and particularly to an electric vehicle kiosk charging and selection system.

BACKGROUND OF THE INVENTION

In many large cities ownership of a personal car or motor scooter is prohibited by the cost for parking and/or the lack of a garage or storage area at the individual's residence or apartment. Public transportation, such as light rail buses or subways, are available in most large metropolitan areas. All of these modes of public transportation are directed to mass transit, restricted to defined routes, run on set schedules and stop at defined locations that are not always in or near a particular area that one or two individuals may want to visit. Therefore, a system of small, electric vehicles, e.g. cars that can be rented by kiosk members or individuals from a kiosk in one location and driven to a kiosk at another location closer to the desired area where the kiosk member of individual wanted to go would be desirable. For such a system to be profitable the kiosk must have a battery charging system that can quickly recharge the most vehicle batteries at the least cost and also select a vehicle with an appropriately charged battery for the individual's desired trip to their selected destination kiosk.

SUMMARY OF THE INVENTION

The present invention provides a system for charging the batteries of one or more electric vehicles in an electric vehicle kiosk in the most efficient and economical method based on battery condition, energy cost, present or expected demand on the utility energy system and other external information relevant to a batteries ability to receive a charge. The charging system can also select a kiosk vehicle, from those available at the kiosk, with sufficient charge for a vehicle user's defined trip to a desired destination kiosk base on the vehicle battery condition, destination kiosk, route selection and current traffic and weather conditions.

BRIEF DESCRIPTION OF THE DRAWINGS

The features of the invention will be more clearly understood from the following detailed description of the invention read together with the drawings in which:

FIG. 2B illustrates in general a typical electric vehicle kiosk charging system using an AC charging source in accordance with the present invention.

FIG. 3 illustrates an electric vehicle kiosk using a random charging priority in accordance with the present invention.

FIG. 4 illustrates an electric vehicle kiosk using a first-in-first-out charging priority in accordance with the present invention.

Figure 1:
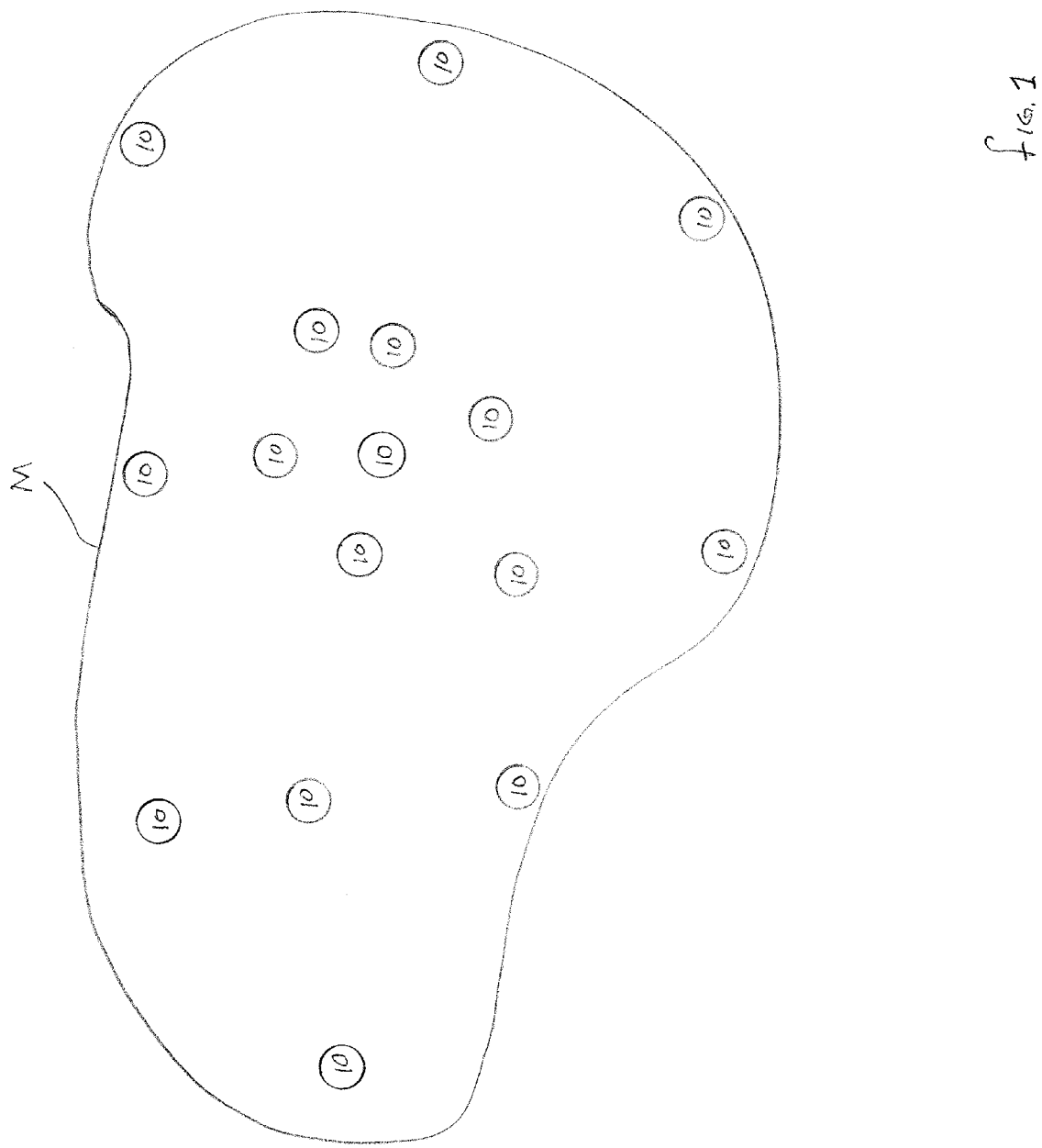
FIG. 1 illustrates in general a metropolitan area with electric vehicle kiosks placed at strategic locations.

Before one embodiment of the invention is explained in detail, it is to be understood that the invention is not limited in its application to the details of construction described herein or as illustrated in the drawings. The invention is capable of other embodiments and of being practiced or being carried out in various other ways. Further, it is to be understood that the phraseology and terminology used herein is for the purpose of description and should not be regarded as limiting.

DETAILED DESCRIPTION OF THE DRAWINGS

FIG. 1 illustrates in general a metropolitan area M with a system of strategically placed electric vehicle kiosks 10, where kiosk members or individuals (vehicle users) can rent a kiosk operated electric vehicle 14 (kiosk vehicle) for a one way trip to a destination kiosk 10 at or near their desired destination. At the destination kiosk 10 the vehicle battery 18 of the kiosk vehicle 14 will be recharged for the next vehicle user's rental.

Figure 2A:
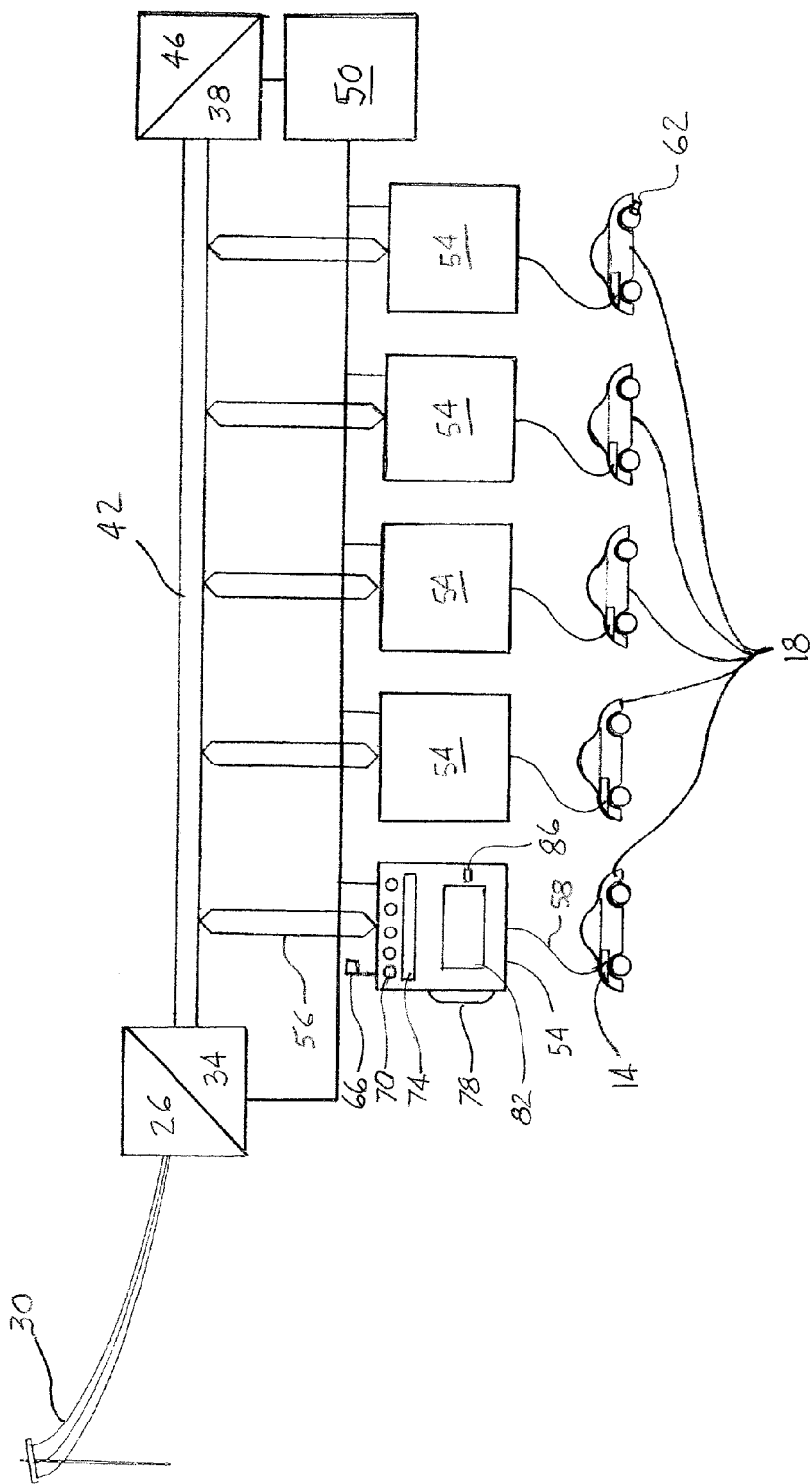
FIG. 2A illustrates in general a typical electric vehicle kiosk charging system using an DC charging source connected to the utility grid in accordance with the present invention.

Referring now to FIGS. 2A and 2B, each kiosk 10 has a charging system 22 that includes an AC charging source 26, connected to the utility grid 30, an AC to DC converter or rectifier 34, and a DC (battery-to-battery) charging source 38. The AC charging source 26 and DC charging source 38 are both connectable to a local power bus 42. The DC charging source 38 includes the vehicle batteries 18 and a bank of backup batteries 46. The charging system 22 also includes a system controller 50 that determines the most efficient method for charging the vehicle batteries 18 and selecting a kiosk vehicle 14 with sufficient vehicle battery charge for a vehicle user's trip. A number of charging stations 54 are connected to the local power bus 42 by a bus or cable 56 and to the system controller 50. The connection between the local power bus 42 and each charging station 54 permits each charging station 54 to receive power from the local power bus 42 or transmit power to the local power bus 42 from a connected vehicle battery 18. As shown in FIG. 2A, the AC-to-DC converter 34 can be connected between the utility grid 30 and the local power bus 42, in which case the local bus 42 is a DC bus. As shown in FIG. 2B, an AC-to-DC/DC-to-AC converter 34 can be located in each of the charging stations 54 and at the backup battery bank 46, in which case the local bus 42 is an AC bus. Each charging station 54 also has a means for connecting 58 to a vehicle battery 18 of one of the kiosk vehicles 14. The means for connecting 58 can be a cable or a wireless power coupling that permits charging or discharging of the vehicle battery 18 through the charging station 54. The system controller 50 monitors the battery charge level and temperature (which affects the charge and discharge rate of vehicle battery 18) and evaluates the condition of the vehicle battery 18 in each kiosk vehicle 14 connected to the charging system 22 at predetermined intervals. The system controller 50 also monitors a number of external information sources, such as ambient temperature, time of day, utility grid demand projections, etc., that provide information used to determine the most efficient order for charging each vehicle battery 18 and which charging source, AC 26 or DC 38, will be used to charge the vehicle batteries 18. The external sources are monitored by known means such as sensors. The system controller 50 also determines which of the available kiosk vehicles 14 has sufficient charge on its battery 18 for a particular vehicle user's requested trip. The vehicle 14 selection is based on the current condition of the vehicle battery 18, as determined during the charging cycle, and information from external sources, such as ambient temperature (very hot or very cold conditions can effect the available battery voltage and rate of discharge), traffic information (accident and road work detours, traffic lights, etc.), weather forecast (rain and snow may require the use of other electric motor such as wipers, lights, etc.), and trip information provided by the prospective vehicle user (stops, hills, etc.) at the time he or she requests a kiosk vehicle 14.

The Kiosk vehicle 14 selected by the system controller 50 would be picked up by the vehicle user (kiosk member or individual) at the convenient kiosk 10 and left at another kiosk 10, located at or near the vehicle user's desired destination. When the vehicle user has reached the destination kiosk 10, the kiosk vehicle 14 will be connected to one of the kiosk charging stations 54. The charging station 54 can include a kiosk vehicle restraint 62, such as a cable lock, wheel lock or an electronic lock in the kiosk vehicle 14 electrical system, that prevents unauthorized use of the kiosk vehicles 14. The system controller 50 will immediately evaluate the percent of charge remaining on the vehicle battery 18 and other battery conditions such as battery temperature, etc. of the newly connected kiosk vehicle 14. The system controller 50 then sets a flag or charge indicator 66 at the vehicle charging station 54 indicating the current minimum battery charge level (full, ¾, ½, ¼ or discharged) of the newly connected kiosk vehicle 14. The flag 66 can be any one of a visual interpretation of a flag, an illuminated indicator (LED) 70 or a display 74 indicating the approximate percent of charge graphically or by actual numbers to any potential vehicle user approaching the charging station 54. The system controller 50 will then compare the charge on vehicle batteries 18 and other monitored characteristics of all kiosk vehicles 14 connected to the kiosk charging system 22. Any vehicle batteries 18 that are fully charged will be placed in a standby mode to prevent overcharging, but will remain connected to the system controller 50 such that the charge and other battery conditions can be evaluated at predetermined intervals and when any new kiosk vehicles 14 are connected to the kiosk charging system 22. The system controller 50 will also monitor the utility grid 30 and determine its current status, such as low demand or usage period, peak or high demand or usage period, low cost period or high cost period. For economic reasons it is most desirable to use the AC charging source 26 only during low grid usage periods and low cost periods.

If the utility grid 30 is in a low usage low cost period the kiosk charging system 22 will begin charging all vehicle batteries 18 and backup batteries 46 from the AC charging source 26 in a selected order that will bring the most vehicle batteries 18 to full charge in the least time or before the next expected peak usage or high cost period begins.

If the utility grid 30 is determined to be in a peak usage or high cost period, or if the grid 30 is unavailable for any other reason, the controller will disconnect the AC charging source 26 and connect the battery-to-battery charging source 38. Based on the battery condition evaluations and the current and forecasted weather conditions the system controller 50 will determine which vehicle batteries 18 can be charged in the least amount of time and begin charging the selected battery or batteries 18 by using energy from those vehicle batteries 18 indicated as requiring the longest time to be fully charged. In certain situations it can be desirable to have a greater number of kiosk vehicles 14 with batteries 18 at a charge level that permits travel to most destination kiosks 10, but is less than a full charge. In this case, the fully charged vehicle batteries 18 may be used to bring lesser charged vehicle batteries 18 up to the desired charge level. The backup batteries 46 of the battery-to-battery charging source 38 are generally charged from the AC source 26 during low usage low cost periods for use in high usage high cost periods. The battery-to-battery charging source 38 can also include electronics for enhancing the ability of lesser charged vehicle batteries 18 to charge higher charged vehicle batteries 18.

The following step for charging vehicle batteries 18 are generally used for a kiosk charging system 22 that does random charging of the vehicle batteries 18 connected to the charging system 22 as shown in FIG. 3.

Random Kiosk Vehicle Battery Charging Process

1. Monitor % of charge and physical characteristics of all kiosk vehicle batteries 18 connected to kiosk charging system 22.
2. Based on the monitored condition set the charge indicating flag 66 of each kiosk charging station 54 to full, ¾, ½, ¼ or discharged to indicate the current minimum charge state of the kiosk vehicle battery 18 connected to that charging station 54.
3. If any kiosk vehicle batteries 18 are fully charged the charging station 54 to which they are connected is placed in a stand by mode to prevent overcharging of the vehicle battery 18.
4. Determine whether it is currently a peak grid usage period or a high cost period.
5. If it is neither a peak usage nor a high cost period charge kiosk vehicle batteries 18 in a selected order (based on charge level, physical characteristics, current weather information, etc.) to bring the most batteries 18 to full charge in the least time from the AC charging source 26.
6. Top off the charge on all kiosk vehicle batteries 18 prior to the next anticipated peak usage or high cost period.
7. If a peak usage or high cost period is determined switch from the AC source 26 to the battery-to-battery charging source 38 and charge kiosk vehicle batteries 18 in a selected order to bring the most batteries 18 to full charge in the least time from the kiosk vehicle batteries 18 having longest time to attain full charge and/or kiosk back-up batteries 46.

It is also possible to use the battery-to-battery charging source 38 in combination with the AC charging source 26, such that the system controller 50 can avoid overloading the grid connection during periods of peak demand. In this way, the system controller 50 can attempt to load level the grid power demand, drawing a more constant amount of power that is close to the time-average charging demand on the AC charging source 26.

A kiosk 10, as shown in FIG. 4, can also be arranged as a first-in-first-out (FIFO) queue, similar to the luggage cart stacks found in many airports. In such a system, kiosk vehicles 14 enter the queue at the back, and travel toward the front of the queue as kiosk vehicles 14 are removed from the front. In other words, the system is now constrained as to which kiosk vehicle 14 must be the next one available for use. In this case, it is necessary to ensure that the vehicle battery 18 of each kiosk vehicle 14 is at full charge by the time it reaches the front of the queue. Accordingly, the charging system 22 will use the AC charging source 26 from the utility grid 30 (when available) to apply charge to the kiosk vehicle 14 closest to the front of the queue that is not yet fully charged. As that kiosk vehicle 14 reaches a full state-of-charge, the system controller 50 will switch to charging the next kiosk vehicle 14 back in the queue that is not yet fully charged. Again, if the utility grid 30 is determined to be in a peak usage or high cost period, or if the grid 30 is unavailable for any other reason, the system controller 50 will disconnect the AC charging source 26 from the local power bus 42 and connect the battery-to-battery DC charging source 38 to provide charge to the front-most kiosk vehicle 14 requiring a charge, from vehicle batteries 18 of kiosk vehicles 14 further back in the queue. A typical charging process for a FIFO queue kiosk is shown and described below.

FIFO Queue Kiosk Vehicle Battery Charging Process

1. Monitor % of charge and physical characteristics of all kiosk vehicle batteries 18 connected to kiosk charging system 22.
2. Based on the monitored condition set the charge indicating flag 66 of each kiosk charging station 54 to full, ¾, ½, ¼ or discharged to indicate current minimum charge state of the kiosk vehicle battery 18 connected to the charging station 54.
3. If any kiosk vehicle batteries 18 are fully charged the charging station 54 to which they are connected is placed in a stand by mode to prevent overcharging the vehicle battery 18.
4. Determine whether it is currently a peak grid usage period or a high cost period.
5. If it is neither a peak usage nor a high cost period charge kiosk vehicle batteries 18 in a selected order (based on position in the queue) to bring the most vehicle batteries 18 to full charge in the least time from the AC charging source 26.
6. Top off the charge on all kiosk vehicle batteries 18 prior to the next anticipated peak usage or high cost period.
7. If a peak usage or high cost period is determined switch from the AC charging source 26 to the battery-to-battery charging source 38 and charge kiosk vehicle batteries 18 in a selected order (based on position in the queue) to bring the vehicle batteries 18 in kiosk vehicles 14 closest to the front of the queue to full charge, by taking charge from vehicle batteries 18 of one or more kiosk vehicles 14 further back in the queue.

A kiosk member can request a kiosk vehicle 14 by telephone, internet or in person at the departure kiosk 10. The kiosk member would have the option of receiving the most fully charged available kiosk vehicle 14 at the departure kiosk 10 or, by providing trip information such as the departure kiosk 10, destination kiosk 10, using a kiosk provided route between the departure and destination kiosk 10 or a variable route, receive a kiosk vehicle 14 that has sufficient vehicle battery 18 charge to accomplish the defined trip. In selecting a sufficiently charged kiosk vehicle 14, the kiosk charging system controller 50 considers current vehicle battery 18 conditions, as determined during the charging cycle, trip information provided by the kiosk member, current weather conditions, current traffic information and various kiosk provided routes to the destination kiosk. A typical selection process of the invention could be as shown below.

Kiosk Vehicle Selection Method

1 Kiosk member requests a kiosk vehicle 14
2 Kiosk member enters password or other unique identification
3 Kiosk member selects destination kiosk 10
4 Kiosk member selects trip type: direct using kiosk map route (price break) or indirect
5 System controller 50 determines minimum vehicle battery 18 charge to reach destination kiosk 10 based on variables comprising: trip type, time of day, traffic information, weather information, ambient temperature, etc.
6 System controller 50 indicates which kiosk vehicle 14 has sufficient vehicle battery 18 charge for Kiosk member's trip
7 Kiosk member proceeds to the indicated charging station 54 connected to the selected kiosk vehicle 14
8 Kiosk member enters password or other unique identification to release the kiosk vehicle restraint 62

A display at each vehicle charging station 54 can indicate the minimum percent of battery 18 charge of the connected kiosk vehicle 14 and the kiosk member assigned to that particular kiosk vehicle 14. It is also understood that the charging station 54 can include means, such a card swipe 78, touch screen (key pad) 82, finger print reader 86 or other input device, for releasing a mechanical or electronic vehicle restraint 62 on the connected kiosk vehicle 14 only to the assigned kiosk member or vehicle user renting the kiosk vehicle 14.

I claim:
1. A charging system for kiosk operated electric vehicles, the charging system comprising:
an AC charging source connected to a utility grid system;
a battery-to-battery DC charging source;
a local power bus connected to both the AC and DC charging sources;
a plurality of charging stations, each being connected to the local power bus such that power can be received from or transmitted to the local power bus, each charging station having means for connecting to a vehicle battery of one of the kiosk operated electric vehicles; and
a system controller being connected to each of the plurality of charging stations, wherein the system controller periodically monitors the condition of the vehicle batteries of all kiosk operated electric vehicles connected to the charging stations and further monitors selected external sources, and, using the monitored information, the system controller determines a priority for charging the vehicle batteries and the AC or DC charging source to be used for charging the vehicle batteries.
2. The charging system of claim 1, wherein the monitored condition of the vehicle batteries includes a percent of charge remaining on each of the batteries of all vehicles connected to charging stations.
3. The charging system of claim 1, wherein the monitored condition of the vehicle batteries includes a temperature of each of the vehicle batteries of all vehicles connected to charging stations.
4. The charging system of claim 2, wherein the priority for charging vehicle batteries is based on the monitored charge levels of the vehicle batteries or the position of the electric vehicles in a kiosk queue, or both.
5. The charging system of claim 1, wherein the plurality of charging stations includes at least one origin kiosk and a plurality of destination kiosks, and wherein the DC charging source uses the charge from one or more vehicle batteries having a higher charge to increase the charge of one or more vehicle batteries having a lower charge to increase a number of the vehicles at the origin kiosk having sufficient vehicle battery charge to reach a majority of the destination kiosks.

6. The charging system of claim 1, wherein the monitored external sources include time of day, current weather conditions and utility grid status including high or low demand and current utility cost.

7. The charging system of claim 6, wherein the system controller selects the AC charging source for charging vehicle batteries when the grid status is low demand and low utility cost.

8. The charging system of claim 6, wherein the system controller selects the DC charging source for charging vehicle batteries when the grid status is high demand or high utility cost or the utility grid is not available, or a combination thereof.

9. The charging system of claim 6, wherein the system controller can select both the AC charging source and the DC charging source and use load leveling techniques to reduce the AC charging source's demand on the utility grid and maintain lower utility cost when the grid status indicates that one or both of the demand or utility cost is high.

10. The charging system of claim 6, wherein the DC charging source uses the charge from one or more vehicle batteries having a lower battery charge to increase the charge of one or more vehicle batteries having a higher battery charge.

11. The charging system of claim 7, wherein the AC charging source charges a bank of backup batteries in the DC charging source.

12. The charging system of claim 11, wherein the DC charging source backup batteries can be used to charge vehicle batteries when the utility grid status is high demand, high cost or the utility grid is not available.

13. The charging system of claim 6, wherein the system controller uses the monitored battery condition, the monitored external sources, a destination kiosk selected by a vehicle user and additional external source information such as current traffic information and possible routes to the destination kiosk to select one of the kiosk vehicles for the vehicle user's trip.

14. A vehicle charging and selecting system for kiosk operated electric vehicles, the charging and selecting system comprising:
   an AC charging source connected to a utility grid system;
   a battery-to-battery DC charging source;
   a local power bus connected to both the AC and DC charging sources;
   a plurality of charging stations, each being connected to the local power bus such that power can be received from or transmitted to the local power bus and each charging station having means for connecting to a vehicle battery of one of the kiosk vehicles for monitoring, charging, or discharging, or a combination thereof, the vehicle battery and means for receiving vehicle user input related to a trip to a desired destination kiosk; and
   a system controller being connected to each of the plurality of charging stations, wherein the system controller periodically monitors the condition of the vehicle batteries of all kiosk operated electric vehicles connected to the charging stations and further monitors selected external sources, and, using the monitored information, the system controller determines a priority for charging the vehicle batteries and the AC or DC charging source to be used for charging the vehicle batteries, the system controller further uses the monitored information and the vehicle user input to select one of the kiosk vehicles having sufficient battery charge for the trip to the desired destination kiosk.

15. The charging and selecting system of claim 14, wherein the monitored condition of the vehicle batteries includes a percent of charge remaining on the vehicle battery and a vehicle battery temperature.

16. The charging and selecting system of claim 14, wherein the priority for charging vehicle batteries can be based on monitored charge levels of the vehicle batteries or the position of each of the kiosk vehicles in a kiosk queue.

17. The charging and selecting system of claim 14, wherein the plurality of charging stations includes a plurality of destination kiosks, and wherein the DC charging source uses the charge from one or more vehicle batteries having a higher charge to increase the charge of one or more vehicle batteries having a lower charge to increase a number of kiosk vehicles at the origin kiosk having sufficient vehicle battery charge to reach a majority of the destination kiosks.

18. The charging and selecting system of claim 14, wherein the monitored external sources include time of day, current weather conditions, utility grid status including high or low demand and current utility cost, current traffic conditions and possible routes to the destination kiosk.

19. The charging and selecting system of claim 18, wherein the system controller selects the AC charging source for charging vehicle batteries when the grid status is low demand and low utility cost.

20. The charging and selecting system of claim 18, wherein the system controller selects the DC charging source for charging vehicle batteries when the grid status is high demand or high utility cost or the utility grid is not available, or a combination thereof.

21. The charging and selecting system of claim 18, wherein the system controller can select both the AC charging source and the DC charging source and use load leveling techniques to reduce the AC charging source's demand on the utility grid and maintain lower utility cost when the grid status indicates that one or both of the demand or utility cost is high.

22. The charging and selecting system of claim 14, wherein the DC charging source uses the charge from one or more vehicle batteries having a lower battery charge to increase the charge of one or more vehicle batteries having a higher battery charge.

23. The charging and selecting system of claim 14, wherein the AC charging source also charges a bank of backup batteries in the DC charging source.

24. The charging and selecting system of claim 23, wherein the DC charging source backup batteries can be used to charge vehicle batteries when the utility grid status is high demand, high cost or the utility grid is not available.

25. A method for charging a vehicle battery of a kiosk operated electric vehicle, the method comprising:
   monitoring a vehicle battery condition of all of the electric vehicles connected to a kiosk charging system;
   monitoring external conditions including current time, utility grid status and current weather conditions;
   selecting one of an AC charging source or a DC charging source based on the utility grid status; and
   selecting one or more vehicle batteries to be charged based on the monitored conditions of all vehicle batteries connected to the kiosk charging system or the location of the kiosk vehicles in a kiosk queue.

26. A method for charging and selecting a kiosk operated electric vehicle, the method comprising:
   monitoring a vehicle battery condition of all of the electric vehicles connected to a kiosk charging system;
   monitoring external conditions relative to the charging and discharging of the vehicle batteries;

selecting one of an AC charging source or a DC charging source based on a utility grid status;

selecting one or more vehicle batteries to be charged based on the monitored conditions of all vehicle batteries connected to the kiosk charging system or the location of the kiosk vehicles in a kiosk queue, or both;

monitoring vehicle user information concerning a selected destination kiosk; and selecting one of the kiosk vehicles with sufficient charge for the vehicle user's trip to the selected destination kiosk.

27. The method of claim 26 wherein the vehicle battery conditions include vehicle battery charge level and vehicle battery temperature.

28. The method of claim 26 wherein the monitored external conditions include current time, utility grid status, current weather conditions, or current traffic information, or a combination thereof.

29. The method of claim 26 wherein the grid status includes high demand, low demand, high utility cost and low utility cost.

* * * * *